United States Patent
Rao et al.

(10) Patent No.: US 10,817,710 B2
(45) Date of Patent: Oct. 27, 2020

(54) PREDICTIVE THEFT NOTIFICATION

(71) Applicants: Manjuprakash R. Rao, Bangalore (IN); Surajit Borah, Bangalore (IN); Hubert A. Patterson, Boca Raton, FL (US)

(72) Inventors: Manjuprakash R. Rao, Bangalore (IN); Surajit Borah, Bangalore (IN); Hubert A. Patterson, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 37 days.

(21) Appl. No.: 16/501,115

(22) Filed: Jun. 12, 2018

(65) Prior Publication Data
US 2020/0057885 A1    Feb. 20, 2020

(30) Foreign Application Priority Data
Jan. 12, 2018 (IN) .............................. 201811001458

(51) Int. Cl.
*G06K 9/00*    (2006.01)
*G06F 9/54*    (2006.01)
*G06K 9/62*    (2006.01)

(52) U.S. Cl.
CPC ......... *G06K 9/00288* (2013.01); *G06F 9/542* (2013.01); *G06K 9/6202* (2013.01); *G06K 9/623* (2013.01)

(58) Field of Classification Search
CPC .. G06K 9/00288; G06K 9/623; G06K 9/6202; G06K 9/00295; G06F 9/542
See application file for complete search history.

(56) References Cited

U.S. PATENT DOCUMENTS

| | | | | |
|---|---|---|---|---|
| 2002/0097145 A1* | 7/2002 | Tumey | ............... | G06K 9/00221 340/426.28 |
| 2004/0213437 A1* | 10/2004 | Howard | ............... | B42D 25/305 382/115 |
| 2013/0215275 A1* | 8/2013 | Berini | ................ | G06K 9/00013 348/150 |
| 2013/0223696 A1* | 8/2013 | Azar | ................... | G06K 9/00892 382/118 |
| 2014/0254890 A1* | 9/2014 | Bergman | ............. | G08B 13/248 382/118 |
| 2015/0033362 A1* | 1/2015 | Mau | ................... | G06K 9/00288 726/27 |
| 2018/0191695 A1* | 7/2018 | Lindemann | ......... | H04L 63/0853 |
| 2019/0050626 A1* | 2/2019 | Berini | .................... | G07C 9/257 |
| 2019/0303551 A1* | 10/2019 | Tussy | ..................... | G06F 21/32 |
| 2019/0332848 A1* | 10/2019 | Padmanabhan | ......... | G06F 16/58 |
| 2019/0392659 A1* | 12/2019 | Seenivasagam | ...... | H04L 9/3231 |

* cited by examiner

*Primary Examiner* — Aaron W Carter
(74) *Attorney, Agent, or Firm* — Arent Fox LLP

(57) ABSTRACT

Predictive theft notifications are used to coordinate appropriate responses to persons who are likely to commit acts of theft. Image data is generated and processed in a computer processing device to recognize the presence of a facial image comprising a face of a person. An analysis is performed of data representative of the facial image to determine a biometric match relative to one or more biometric models of facial images stored in a database. Based on this analysis, at least one predictive notification is generated with regard to a future potential theft of merchandise from the secured facility. The predictive notification is generated based upon a determination of the biometric match.

16 Claims, 9 Drawing Sheets

PREDICTIVE THEFT NOTIFICATION

CROSS REFERENCE TO RELATED APPLICATIONS

This application claims priority to Indian Patent Application No. 201811001458 filed on Jan. 12, 2018, the disclosure of which is hereby incorporated herein by reference in its entirety.

BACKGROUND

Statement of the Technical Field

The present document relates to implementing systems and methods for facial recognition. More particularly, the present document relates to improved implementing systems and methods for facial recognition in areas which utilize Electronic Article Surveillance ("EAS") systems.

Description of the Related Art

Increasingly, retail stores need to combat Organized Retail Crime ("ORC"). An ORC scenario typically involves a group of thieves who will steal large amounts of merchandise in one visit. Such persons will commonly trigger an EAS alarm when they leave the store with merchandise having an attached active EAS tag, but an alarm at such time may be too late. Retail store clerks are poorly equipped to deal with aggressive groups of persons intent on stealing, and in fact are frequently forbidden by employer guidelines from taking any action beyond verbal contact. Moreover, an EAS alarm initiated as a group of thieves is rushing out the exit is often too late to be of much use from a theft prevention standpoint.

Another EAS problem involves certain individuals who repeatedly engage in shoplifting activities. Such individuals may initiate an EAS alarm as they are rushing out an exit door, but there is little a store clerk can do at such time to deal with the problem. Notably, the same person can subsequently travel to a second store location (sometimes of the same retail store chain) and continue his/her illicit activity because the person will not be known at the second store.

EAS systems can include imaging devices to provide enhanced performance. For example, International Publication No. WO 2004/034347 discloses a system in which video surveillance is used with an EAS system. An EAS system incorporating video sensors is also described in U.S. Pat. No. 7,961,096. In that system, a video analysis process is used in combination with the EAS system. The video analysis process is capable of detecting the presence, location and motion of objects. To this end, it is disclosed that the video sensors can be positioned overhead of a pair of EAS pedestals or can be integrated directly into the pedestals (e.g. on top of a pedestal).

In certain RFID tag systems a trigger event (e.g. an RFID tag detection) can be used to determine when image media is captured or processed. For example, U.S. Publication No. 2012/0056722 discloses an RFID system in which a trigger event can automatically trigger certain processing, such as facial recognition processing. When an RFID badge is detected the system can automatically perform facial recognition to determine whether the face of a person in a captured image matches the person associated with the tagged badge ID.

SUMMARY

The present document concerns implementing systems and methods for generating a predictive theft notification at a secured facility, such as a retail store. Predictive theft notifications can be used to coordinate appropriate responses to persons who are likely to commit acts of theft. The method involves generating image data using at least one imaging device and then processing the image data in a computer processing device. The processing is performed to recognize the presence of a facial image comprising a face of a person within the image data. The method further involves performing an analysis of data representative of the facial image to determine a biometric match relative to one or more biometric models of facial images stored in a database. Based on this analysis, at least one predictive notification is generated with regard to a future potential theft of merchandise from the secured facility. The predictive notification is generated based upon a determination of the biometric match. The methods involve applying selective control of a content of the database to reduce predictive notifications which are false predictions.

According to one aspect, the selective control referenced herein involves a rules-based enrollment process. In such process, one or more facial images of different persons can be concurrently captured in the same image frame. For example, such facial images can be captured by an imaging device for possible enrollment in the database responsive to a theft alert trigger event.

In one scenario, the rules based enrollment process can involve automatically selecting at least one facial image for enrollment based on a measured distance from a predetermined alert detection location. In another scenario, the rules-based enrollment process can involve automatically selecting at least one facial image for enrollment based on a relative size of a facial image within a captured image frame as compared to other faces captured within the image frame. In a third scenario, the rules-based enrollment process can involve automatically deselecting at least one facial image for enrollment based on a determination that at least one facial image captured within an image frame is already present within the database. The rules-based enrollment process can also involve a comparison of at least one facial image captured within an image frame at the time of a theft detection alert, with at least one facial image captured at a point-of-sale.

According to one aspect, the rules-based enrollment process involves a comparison of at least one facial image captured within an image frame at the time of a theft detection alert, with at least one facial image captured in response to detected physical motion of an electronic tag associated with an item of merchandise. In such a scenario, the enrollment process can further comprise a comparison of a value (e.g., a product skew) associated with the electronic tag at the time of the detected physical motion and a value of an electronic tag which resulted in the theft alert trigger event. For example, the process can involve automatically deselecting for inclusion in the database at least one facial image based on a determination that the at least one deselected facial image was not captured as a result of physical motion of the electronic tag which caused the theft alert trigger event.

In some scenarios, the rules-based enrollment process can involve applying or assigning a weighting value to at least one facial image stored in the database. For example, this value can be assigned based on at least one characteristic of a facial image. The at least one characteristic can be selected from the group consisting of relative distance from a location where a theft alert triggering event was detected, a relative size of a first facial image as compared to at least a second facial image captured in the same image frame, and preexisting enrollment of the facial image in the database.

In other scenarios, the rules-based enrollment process involves concurrently enrolling a plurality of facial images in the database. Such enrolling can be responsive to an occurrence of one or more facial images of different persons being concurrently captured by an imaging device in the same image frame. For example, the image frame can be automatically captured by an imaging device for possible enrollment of facial image data in the database responsive to a theft alert trigger event.

The method can also involve selectively de-enrolling at least one facial image from the database in response to an occurrence of at least one event subsequent to the initial enrollment. For example, the event can comprise a subsequent theft detection trigger event involving detection of a facial image associated with a second one of the one or more facial images of different persons which was concurrently captured in the image frame.

The present solution can also involve determining personal identifying information about the person whose facial image was captured in an image frame by using at least a second imaging device. For example, the second imaging device can be an imaging device located in a parking lot to capture vehicle license plate data, or a can be an imaging device located at a point of sale kiosk or checkout counter.

In some scenarios disclosed herein, machine learning can be applied to information collected at the time of a theft alert trigger event to predict at least one loss-prevention event. The information used for this purpose can include a variety of different information types, such as facial image data, store location, time of day, week or month when a face identification occurs, a time interval between two detections of a theft event, a time spent by a person who's facial image is already present in the database, a license plate number in a parking lot at a time when a facial image was enrolled or a theft detection alert occurred, detection at a point of sale location, item level identification information at the time of theft detection.

According to another aspect, a system is disclosed for generating a predictive theft notification at a secured facility. The system includes at least one imaging device arranged to generate image data. The system also includes one or more computer processing devices. The one or more computer processing devices are configured to recognize the presence of a facial image comprising a face of a person within the image data. The one or more computer processing devices also perform an analysis of data representative of the facial image. The purpose of this analysis is to determine a biometric match relative to one of the biometric models of facial images stored in a database. If a biometric match is identified in this step, then at least one predictive notification is generated to warn of a future potential theft of merchandise from the secured facility. The system is similar to the method described above insofar as it can involve applying selective control over a content of the database to reduce predictive notifications which are false predictions.

BRIEF DESCRIPTION OF THE DRAWINGS

The present solution will be described with reference to the following drawing figures, in which like numerals represent like items throughout the figures.

DETAILED DESCRIPTION

Figure 1:
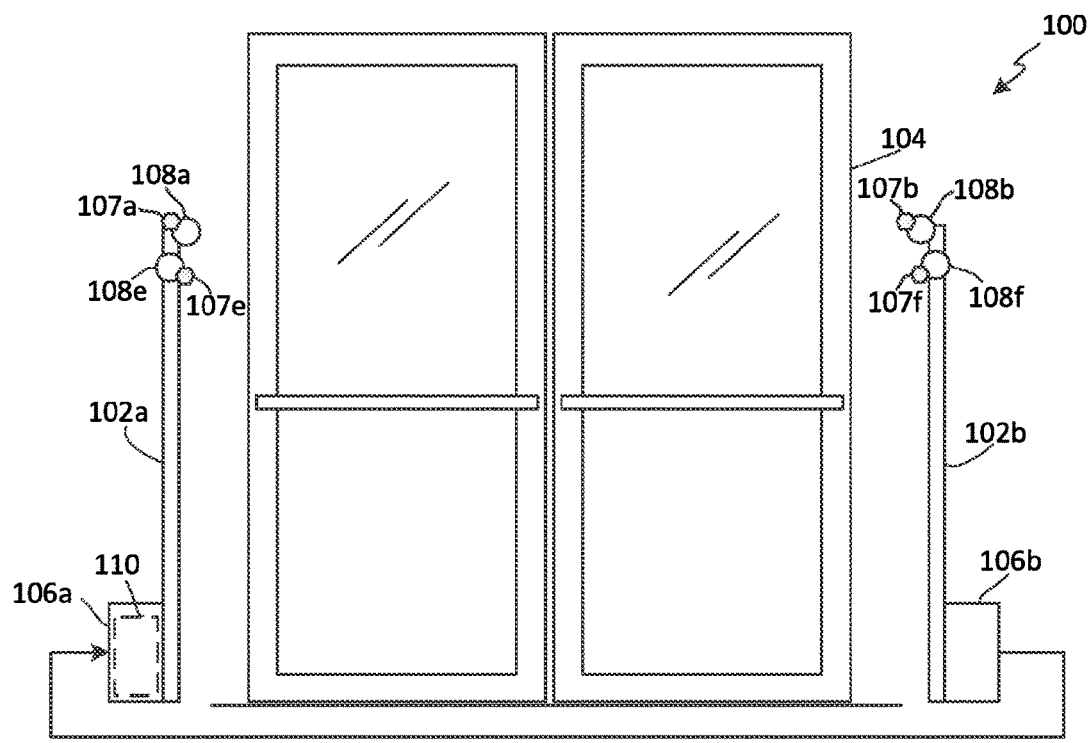
FIG. 1 is a side view of an EAS detection system.

This disclosure is best understood with reference to the attached figures. The figures are not drawn to scale and they are provided merely to illustrate certain example scenarios. Several aspects are described below with reference to example applications for illustration. It should be understood that numerous specific details, relationships, and methods are set forth to provide a full understanding. The various scenarios are not intended to limit the invention to the illustrated ordering of acts or events, as some acts may occur in different orders and/or concurrently with other acts or events. Furthermore, not all illustrated acts or events are required to implement a methodology disclosed herein.

The operation of an EAS system can be improved by including advanced facial identification capability. For example, an EAS system can be improved by facilitating identification of specific individuals by comparison of their facial features to known biometric models which are stored in a database. In such a scenario, a database can be created which contains information suitable for not just recognizing faces (facial recognition), but for actually identifying specific known individuals (facial identification) based on facial features. A database as described herein is populated with information suitable to facilitate facial identification. The facial information is assembled by using one or more imaging devices, which can be located, for example, at one or more EAS pedestals. When an EAS alarm is detected, facial image information for the person who triggered the alarm is captured and stored in the database. Subsequently, if the same person enters such retail establishment at a later date, his facial image can be captured as he/she enters, and can be compared against the facial information stored in the database. The person will then be identified as a person previously known to have triggered an EAS alarm. At this point, an alert can be generated. The alert can inform the store clerk that the person is known to have previously triggered an EAS alarm. In response, the clerk can notify police or appropriate store security personnel who are equipped to deal with situations involving a potential theft. Alternatively, the system can configured to automatically notify police or store security personnel. The presence of security personnel or police at the retail establishment can discourage any potential thievery, and will facilitate a suitable enforcement response in the event any theft may be attempted. Accordingly, the EAS system described herein can function in a predictive manner to prevent theft, by identifying in advance persons who are known to have triggered EAS alarms in the past.

According to one aspect, the cameras used to capture facial images at the times when EAS alarms are triggered may be conventional video cameras (e.g., RGB cameras). However, in other scenarios stereoscopic cameras, or video cameras integrated with a depth sensor or depth sensor array can be used. The depth sensors in such scenarios would be capable of providing the distance of subjects from the camera.

The face images (of suspected shop lifters) which correlate with the time instances of EAS pedestal alarms will be tagged and enrolled anonymously in a database. But in situations where there are multiple persons proximal to the EAS pedestal (at around the same distance from the camera), then face images of all the persons can be enrolled in the database after a deduplication step. But during this process, it is likely that face images of genuine shoppers (i.e., shoppers not involved in theft) would be enrolled in the database. There is a need to distinguish real shop lifters from genuine shoppers and not to cause embarrassment to genuine shoppers.

A system disclosed herein will be capable of identifying and distinguish repeat shoplifting offenders from genuine shoppers. Based on such information, the system then can exclude and/or delete face images of the genuine shoppers from the database. Various techniques can be used to discriminate from among a group of shoppers captured in an image frame. For example, in one scenario the system could apply an algorithm which assumes that the person closest to the pedestal is the one who most likely set off the EAS alarm. Such closeness can be evaluated by the system based on the information from the depth sensor or depth sensor array.

When a known shoplifter enters a store and his/her face is identified with corresponding face data stored in the database, then an alert can be communicated ton one or more store associates. For example, an alert can be sent to a computer display and/or a smartphone application provided to store associates. In some scenarios, the alert would contain the face image stored of the repeat offender as stored in the database as well as the face image more recently captured by the camera. Consequently, the store associates can be provided with contextual information so that appropriate counter measures can be undertaken. The database may be updated with a plurality of face images of suspects during their repeated visits to a store in order to enrich the face image database and make the face recognition system more accurate.

As explained below in further detail, the cameras can also be mounted at point of sale (POS) or self-checkout terminals, shopping aisles, and in parking lots in order to capture face images and perform face recognition. The information captured from such cameras can also be utilized in other ways which are discussed below in greater detail. A method and system for predictive theft notification at a secured facility, such as a retail store, is disclosed below in relation to FIGS. 1-9. Following that discussion, there is provided a more detailed disclosure of an advanced face recognition system for repeat offender identification in a retail store.

Facial recognition and identification requires significant processing and database resources. Accordingly, it is advantageous to perform such identification processing at a single centralized location at the facility or elsewhere. But centralized processing of images to discern facial images and facilitate actual identification of individuals based on such images can require continuous communication of streaming video image data from each camera location to the central server. Once this video data is received, the centralized server must process each video stream to identify human faces, select one or more facial images containing an image of a person's face, and then analyze the images to facilitate identification of that person. A key limitation in such a system is the substantial communication bandwidth required to transmit video data from all of the various imaging devices to the centralized server facility. The bandwidth problem is particularly acute in those scenarios where the video image data is communicated wirelessly from the video imagers to the central server which performs facial identification processing.

In order to overcome the above-described problem, information representing a facial image can in some scenarios be communicated to a central server only after a facial image is discerned within a video image. The image data (i.e., data representing a facial image which has been detected) can be automatically communicated once a face is detected, or can be selectively communicated based on certain EAS criteria as determined by an EAS pedestal. For example, in some scenarios, the image can be communicated only when an EAS tag is detected within an EAS detection zone. Of course this is merely one possible architecture that can be implemented to facilitate design considerations affecting a particular system, and the system is not intended to be limited in this regard.

One aspect of the present disclosure involves sensing at least one parameter at an EAS pedestal to detect a presence of an EAS tag. Concurrently with such sensing, image data is generated at the EAS pedestal using one or more imaging devices. The imaging device(s) are mounted in a suitable location for observing an EAS sensing area. For example, one or more imaging devices can be mounted on the EAS pedestals which are used to monitor a particular entry or exit of a facility. In some scenarios, the imaging devices can be located at different heights to accommodate image capture of individuals having different physical heights. In some scenarios disclosed herein, the image data can be processed in a computer processing device located at the EAS pedestal. For present purposes, the computer processing device is considered to be at the EAS pedestal if it physically located within the pedestal or is nearby (e.g. in the ceiling above the pedestal or a short distance away). The processing at the EAS pedestal is performed to facilitate recognition of a facial image (comprising a face of a person) within the image data being generated by the one or more imaging devices. Notably, processing at this stage does not necessarily involve identification of a particular individual, but rather a simple recognition that a person's face is present within an image. As a result of such processing, data representative of a facial image is communicated (in all cases or selectively) to a server at a location remote from the EAS pedestal. Additional actions can also be performed at the EAS terminal responsive to the aforementioned processing to facilitate operations of the EAS terminal.

Figure 3:
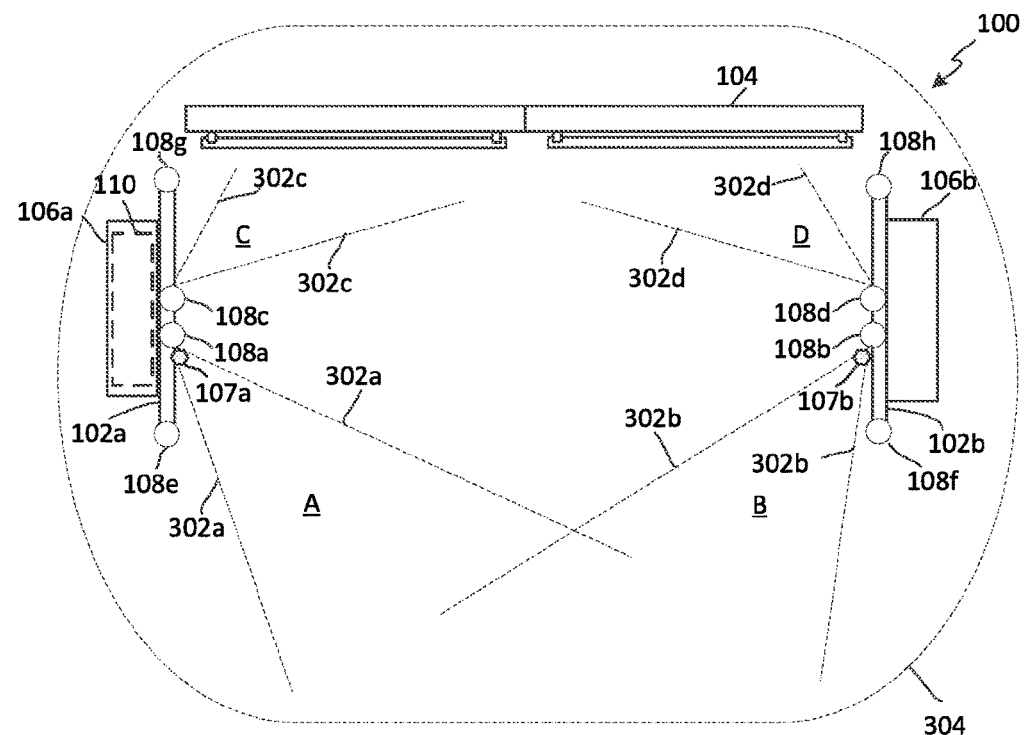
FIG. 3 is a top view of the EAS detection system in FIG. 1, which is useful for understanding a EAS detection zone and a camera field of view.
Figure 4:
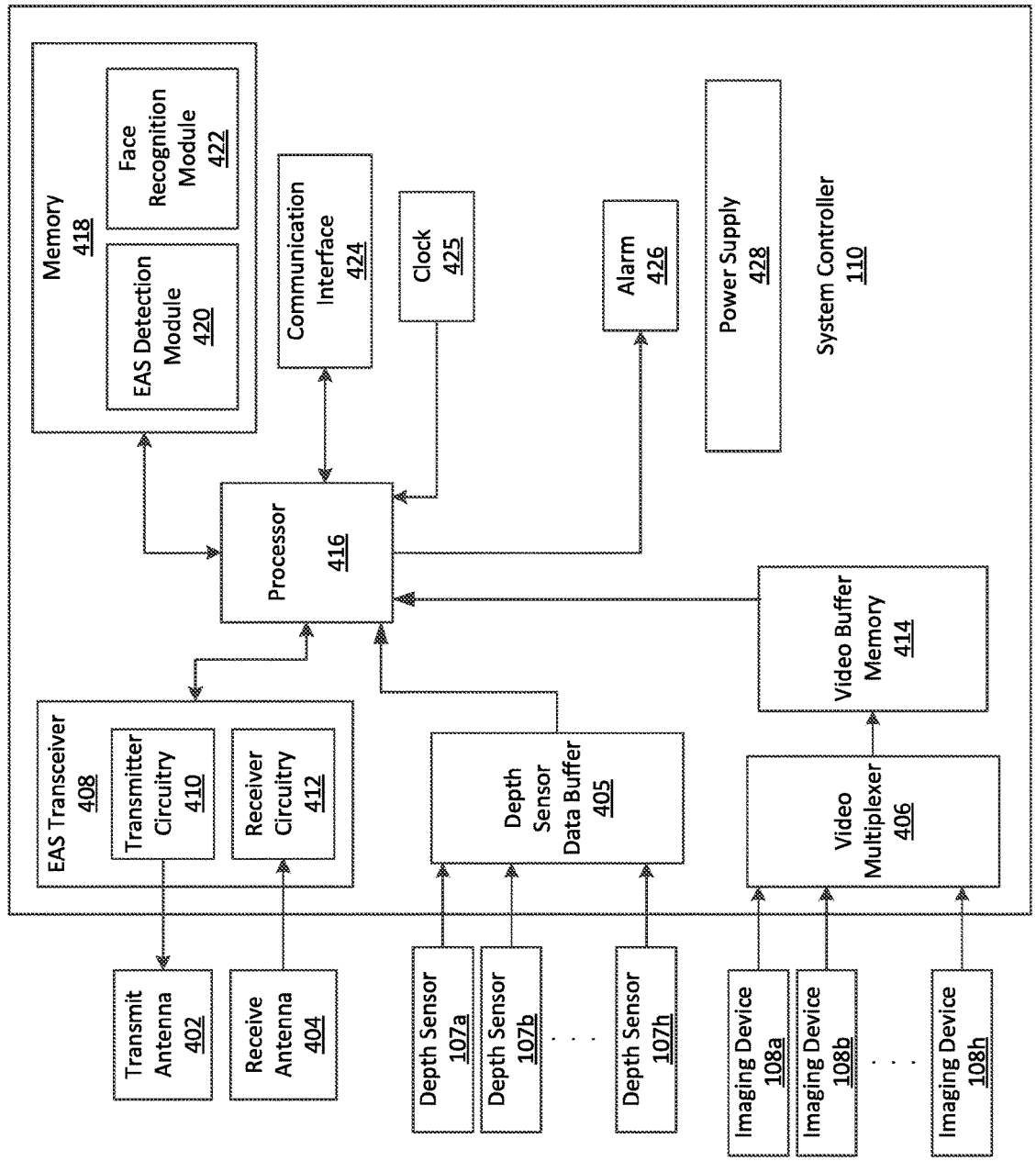
FIG. 4 is a block diagram that is useful for understanding an arrangement of an EAS controller which is used in the EAS detection system of FIGS. 1 and 2.

Referring now to the drawings figures in which like reference designators refer to like elements, there is shown in FIGS. 1, 3, and 4 an illustrative EAS detection system 100. The EAS detection system will be positioned at a location adjacent to an entry/exit 104 of a secured facility (e.g. a retail store facility). The EAS system 100 uses specially designed tags (not shown) which are applied to store merchandise or other items which are stored within a secured facility. The tags can be deactivated or removed by authorized personnel at the secure facility. For example, in a retail environment, the tags could be removed or deactivated by store employees. When an active tag is in an EAS detection zone 304 near the entry/exit, the EAS detection system 100 will detect the presence of such tag and will sound an alarm or generate some other suitable EAS response. Accordingly, the EAS detection system 100 is arranged for detecting and preventing the unauthorized removal of articles or products from controlled areas.

A number of different types of EAS detection schemes are well known in the art. For example, known types of EAS detection schemes can include magnetic systems, acousto-magnetic systems, radio-frequency type systems and microwave systems. For purposes of describing the inventive arrangements in FIGS. 1, 3, and 4, it shall be assumed that the EAS detection system 100 is an acousto-magnetic type system. Still, it should be understood that the present solution is not limited in this regard and other types of EAS detection methods can also be used with the present solution.

Figure 2:
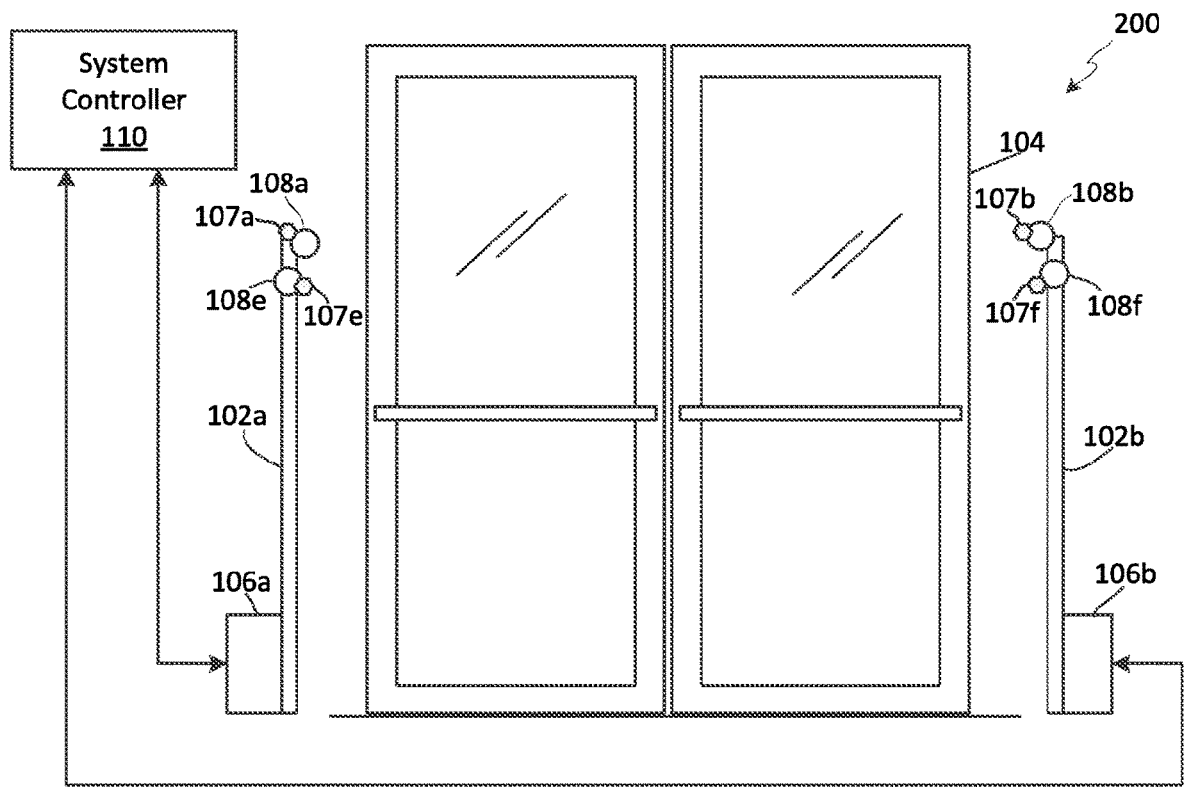
FIG. 2 is a side view of an alternative embodiment of the EAS detection system in FIG. 1.

In a scenario disclosed herein an EAS detection system 100 includes a pair of pedestals 102a, 102b, which are located a known distance apart at opposing sides of an entry/exit 104. The pedestals 102a, 102b can be stabilized and supported by a base 106a, 106b. Pedestals 102a, 102b will generally include an antenna suitable for aiding in the detection of the special EAS tags as described herein. For example, pedestal 102a can include a transmit antenna 402 and pedestal 102b can include an EAS receive antenna 404 as shown in FIG. 4. The antennas located in the pedestals 102a, 102b are electrically coupled to a system controller 110, which controls the operation of the EAS detection system to perform EAS functions as described herein. In some scenarios, a single pedestal 102a can be used for the EAS detection system 100 instead of two pedestals shown. In such embodiments, a single antenna can be provided in the pedestal 102a. The single antenna is configured for transmitting an exciter signal for the EAS tags and for detecting the response of such EAS tags. The single antenna is selectively coupled to the EAS receiver and the EAS transmitter in a time multiplexed manner so as to facilitate each function The system controller can be located within a base of one of the pedestals as shown in FIG. 1. Alternatively, the system controller can be located within a separate chassis at a location within the immediate area surrounding the pedestals. For example, the system controller 110 can be located in a ceiling just above or adjacent to the pedestals. Such locations are deemed to be at the EAS pedestal for purposes of the present disclosure. An arrangement in which the EAS controller is located in a separate housing, but still local (e.g. within 5 to 50 feet) of the EAS pedestal, is illustrated in FIG. 2. For present purposes, a system controller will be deemed to be located at the EAS pedestal if it is located within the pedestal or is located within this distance. According to yet another embodiment, the functions of the system controller 110 can be distributed among processing elements (not shown) which are disposed in the pedestal (e.g. pedestal 102a) and in a separate chassis at a location within the immediate area surrounding the pedestal as described herein. A system controller 110 with distributed elements as described will also be deemed for purposes of this solution to be located at the EAS pedestal.

EAS detection systems are well known in the art and therefore will not be described here in detail. However, those skilled in the art will appreciate that a transmit antenna 402 of an acousto-magnetic type EAS detection system is used to generate stimulus signals. The stimulus signals cause a mechanical oscillation of a strip (e.g. a strip formed of a magnetostrictive, or ferromagnetic amorphous metal) contained in a tag within a detection zone 304. As a result of the stimulus signal, the tag will resonate and mechanically vibrate due to the effects of magnetostriction. This vibration will continue for a brief time after the stimulus signal is terminated. The vibration of the strip causes variations in its magnetic field, which can induce an AC signal in the receiver antenna. This induced signal is used to indicate a presence of the strip within the detection zone 304.

According to one aspect disclosed herein, one or more imaging devices 108a, 108b, 108c, 108d are provided to capture images of the faces of people who are entering and/or leaving through the entry/exit 104. These imaging devices can be located in any suitable location, but in at least one scenario are located on the pedestals 102a, 102b. For example, the imaging devices 108a, 108b, 108c, 108d can be located at a top or upper portion of the pedestals 102a, 102b as shown in FIGS. 1-3. The imaging devices can be arranged for capturing images of persons entering or leaving the premises of the secured facility. In some scenarios one or more imaging devices can be located at different heights to facilitate capturing facial images of individuals having different stature. According to one aspect, imaging device 108a, 108b can be arranged to capture images of persons leaving the premises, whereas imaging devices 108c, 108d can be arranged to capture images of persons entering the premises. This concept is illustrated in FIG. 3, which shows that imaging device 108a will have a field of view "A" indicated by lines 302a, and imaging device 108b will have a field of view "B" indicated by lines 302b. Similarly, imaging device 108c will have a field of view "C" indicated by lines 302c, and imaging device 108d will have a field of view "D" indicated by lines 302d.

Additional imaging devices can be provided on the pedestals 102a, 102b without limitation. For example imaging devices 108e, 108f, and 108g, 108h can be provided respectively at the front and rear edges of the pedestals as shown in FIGS. 1 and 2. In order to avoid obscuring the present solution, fields of view for the additional imaging devices are not shown. However, those skilled in the art will appreciate than the imaging devices 108e, 108f, 108g, 108h can have a field of view that is advantageous for obtaining facial image data. For example, the imaging devices 108e, 108f, 108g, 108h can each have a field of view which is chosen to capture facial image data of persons as they approach the EAS detection zone 304.

One or more depth or distance sensing devices can be provided to measure a distance of persons/faces from the imaging devices. According to one aspect, these depth sensing devices can be ultrasonic sensors which use reflected ultrasonic signals generated by a source to detect the presence of persons/faces and or objects which are up to a predetermined distance from the sensor. In other scenarios, the depth sensors can comprise stereoscopic cameras which can be independent of or integrated with the imaging devices 108a-108h. Sensors of this kind are well-known in the art and therefore will not be described here in detail. However, it should be understood that any type of depth or distance measuring sensor can be used for this purpose.

The depth sensing devices can be positioned and/or oriented to measure such distances concurrent with capturing images of the faces of people who are entering and/or leaving through the entry/exit 104. These depth sensing devices can be located in any suitable location, but in at least one scenario are located on the pedestals 102a, 102b. For example, the depth sensing devices 107a, 107b, 107e, 107f can be located at a top or upper portion of the pedestals 102a, 102b as shown in FIGS. 1-3. In some scenarios, each of the depth sensing devices can be integrated with an imaging device (e.g., imaging devices 108a-108h) so that the depth or distance that is measured corresponds to a distance between each particular imaging device and objects in the field of view of such imaging device.

According to one aspect, certain depth sensing devices can be arranged to determine a distance to persons leaving the premises, whereas other depth sensing devices can be arranged or positioned to measure a distance to persons entering the premises. For example, a depth or distance sensor 107a could have a field of view "A" which overlaps with the field of view of an imaging device 108a. Likewise a depth sensor 107b could have a field of view that overlaps the field of view "B" of an imaging device 108b. A similar arrangement with additional depth sensors (not shown in FIG. 3) can be used to measure distance with respect to persons/faces and objects in fields of view associated with imaging devices 108a-108h. To avoid obscuring the present solution, only depth sensors 107a, 107b are explicitly shown in FIG. 3.

Referring once again to FIG. 4, there is provided a block diagram that is useful for understanding the arrangement of the system controller 110. The system controller comprises a computer processing device including processor 416. The processor 416 can be a central processing unit (CPU)), and can optionally include a dedicated video processing device (not shown) to facilitate image processing as described herein. The system controller also includes a computer readable storage medium, such as memory 418 on which is stored one or more sets of instructions (e.g., software code) configured to implement one or more of the methodologies, procedures or functions described herein. The instructions (i.e., computer software) can include an EAS detection module 420 to facilitate EAS detection and a face recognition module 422 to facilitate recognition of a human face contained within an image. These instructions can also reside, completely or at least partially, within the processor 416 during execution thereof.

The system also includes an EAS transceiver 408, including transmitter circuitry 410 and receiver circuitry 412. The transmitter circuitry is electrically coupled to transmit antenna 402 and the receiver circuitry 412 is electrically connected to receive antenna 404 as shown. As noted above, a single common antenna can be used in the present solution for both receive and transmit operations. In such scenarios, a suitable multiplexing arrangement is provided to facilitate both receive and transmit operation.

The system controller 110 can also include one or more circuit components to facilitate the video processing actions as hereinafter described. As such, the system controller 110 can include a video multiplexer 406 for receiving and routing video streams from a plurality of video imaging devices 108a, 108b, 108c, . . . 108h. The system controller 110 can also include a video buffer memory coupled to the video multiplexer for storing and buffering video image data which is to be processed in the processor 416.

The system controller 110 can also include one or more circuit components to facilitate depth perception processing operations as described herein. As such, the system controller 110 can include a depth sensor data buffer 405 for receiving, buffering and routing data streams from a plurality of depth sensing devices 107a, 107b, 107c, . . . 107h. The output of depth sensor data buffer 405 can be communicated to the processor 416 as shown.

Additional components of the system controller 110 can include a communication interface 424 configured to facilitate wired and/or wireless communications from the system controller 110 to a remotely located EAS system server as hereinafter described. The system controller can also include a real-time clock, which is used for timing purposes, an alarm 426 (e.g. an audible alarm, a visual alarm, or both) which can be activated when a tag is detected within the EAS detection zone 304. A power supply 428 provides necessary electrical power to the various components of the system controller 110. The electrical connections from the power supply to the various system components are omitted in FIG. 4 so as to avoid obscuring the present solution.

Figure 5:
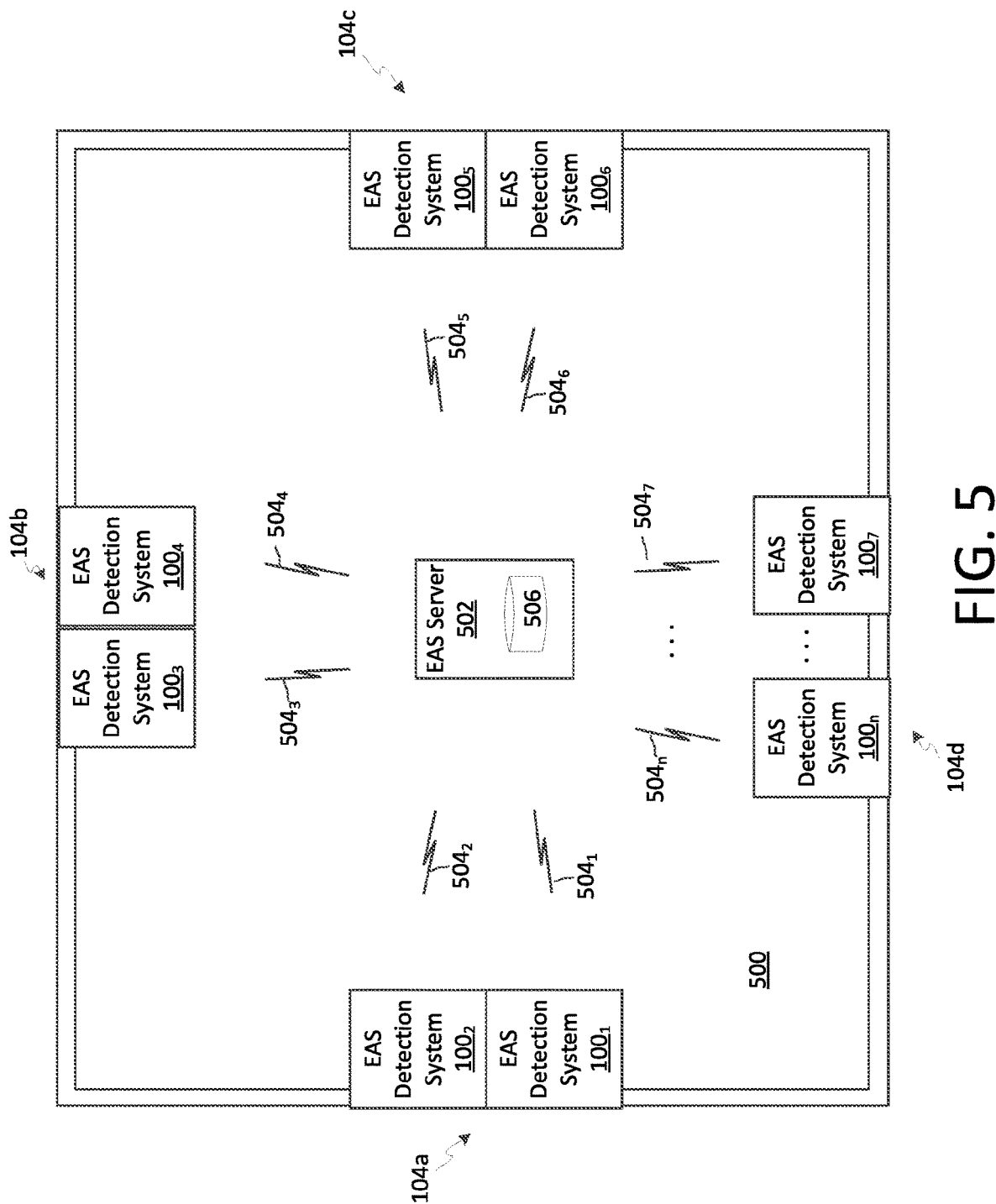
FIG. 5 is diagram that is useful for understanding how a plurality of EAS detection systems shown in FIG. 1 can be integrated into a secured facility which includes an EAS server.

Referring now to FIG. 5, there is provided a drawing of a secured facility 500 which has several points of entry/exit 104a, 104b, 104c, 104d. In the scenario shown in FIG. 5, one or more EAS detection systems $100_1$-$100_n$ is provided at each point of entry/exit to prevent unauthorized removal of tagged items from the premises. Each EAS detection system $100_1$-$100_n$ is similar to the EAS detection system described herein with respect to FIGS. 1-4. In some scenarios, each of the EAS detection systems $100_1$-$100_n$ can communicate with an EAS server 502 to coordinate EAS operations and facilitate operation of a facial identification system. For example such communications can be facilitated by means of a plurality of communication links $504_1$-$504_n$. Communication links $504_1$-$504_n$ can be comprised of any suitable type of wired or wireless communication link. For example, the communication links can be comprised of a wireless local area network utilizing a conventional well known wireless LAN standard, such as IEEE 802.11. Still, the present solution is not limited in this regard and other types of communication links can also be used for this purpose.

Figure 6:
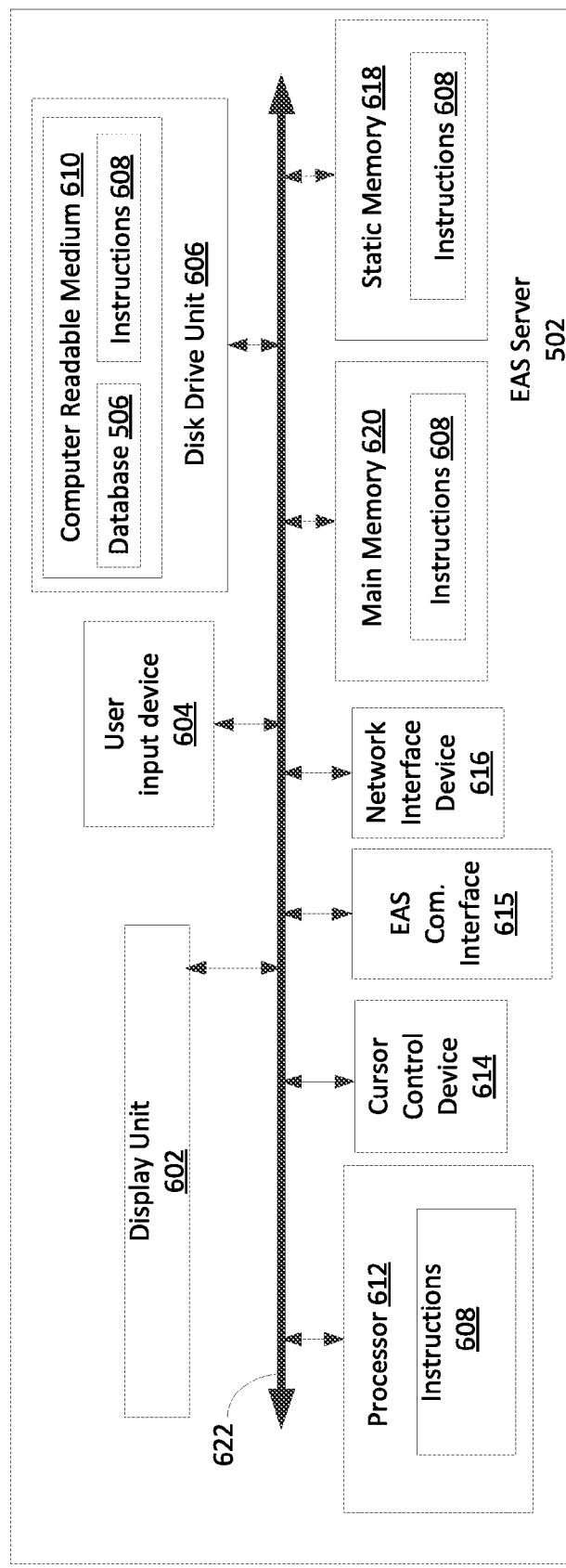
FIG. 6 is a block diagram that is useful for understanding an EAS server which can be used in the present solution.

A block diagram showing one example of an EAS server 502 is provided in FIG. 6. The EAS server 502 includes a processor 612 (such as a central processing unit (CPU), and can optionally include a separate dedicated video processing unit (not shown). The EAS server also includes a disk drive unit 606, a main memory 620 and a static memory 618, which communicate with each other via a bus 622. The server 502 can further include a display unit 602, such as a video display (e.g., a liquid crystal display or LCD), a flat panel, or a solid state display. The server 502 can also include a user input device 604 (e.g., a keyboard), a cursor control device 614 (e.g., a mouse) and a network interface device 616 for communicating with a computer network.

The disk drive unit 606 includes a computer-readable storage medium 610 on which is stored one or more sets of instructions 608 (e.g., software code) configured to implement one or more of the methodologies, procedures, or functions described herein. The instructions 608 can also reside, completely or at least partially, within the main memory 620, the static memory 618, and/or within the processor 612 during execution thereof by the computer system. The main memory 620 and the processor 612 also can constitute machine-readable media.

The EAS server 502 can have access to a database 506 containing biometric models which are useful for identifying specific individuals based on information representative of a facial image. The database can be stored in a disk drive unit 606 or in a separate memory device which is accessible to the EAS server. The database 506 is created by collecting facial image data (e.g. in the form of biometric models) for specific persons who are known to have triggered EAS alarms in the past. In some scenarios, the database can be populated using techniques as hereinafter described in relation to FIG. 7. More particularly, the database can be advantageously populated with facial information concerning persons who have triggered EAS alarms at a retail store location. In some scenarios described herein, the data may be limited to persons who have triggered an EAS alarm at a particular secured facility 500. Alternatively, the database can be populated with facial information concerning persons who have triggered EAS alarms at a group of secured facilities 500 comprising a plurality of retail store locations of a particular retail store chain.

In a further alternative embodiment, the database 506 can be populated with facial information concerning persons who have triggered EAS alarms at a plurality of secured facilities 500 participating in a facial image data collection process as described herein. Such secured facilities 500 may or may not be related to one another as part of the same business unit or retail store chain. Accordingly, facial image data concerning persons who have triggered and EAS alarm can be collected at a plurality of secured facilities 500 (which may be separate retail store chains, and/or separate retail business entities) that have adopted systems incorporating the inventive arrangements as described herein). Regardless of the specific method used to assemble and maintain the database, it will contain information suitable for not just recognizing faces (facial recognition), but for actually identifying specific known individuals (facial identification) based on facial features.

Figure 7:
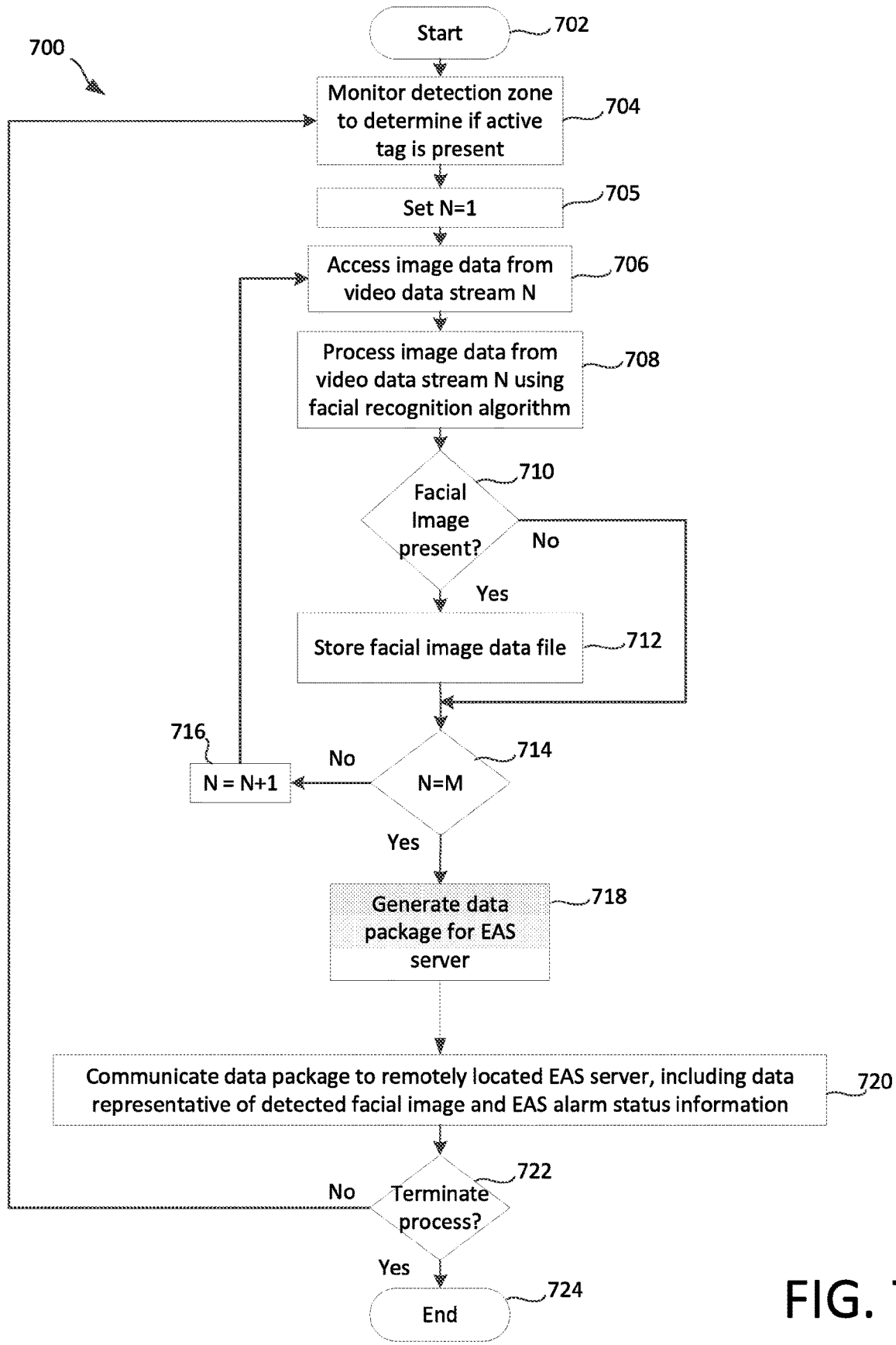
FIG. 7 is a flowchart that is useful for understanding the present solution.

Referring now to FIG. 7 there is provided a flowchart 700 that is useful for understanding how facial image data can be collected for evaluation in accordance with certain scenarios disclosed herein. As such, the flowchart 700 can be useful for understanding certain processing which may be performed at an EAS pedestal 110.

The process begins at 702 and continues at step 704 where a detection zone 304 is monitored to determine if an active EAS tag is present. Computer software included in EAS detection module 420 is advantageously used to facilitate EAS monitoring. The monitoring can be performed continuously, on a periodic basis, or in any other suitable manner as is known to those skilled in the art. For example, in some embodiments the monitoring at step 704 can continue during steps 705-720 as hereinafter described. The results of the monitoring at step 704 can be temporarily stored in a memory of the system controller 110. For example, the EAS monitoring result can be stored in a memory 418 together with a time stamp which specifies a time when an active tag was detected. The time stamp can be determined based on a time value provided by clock 425.

At step 705, an index value N is set to a value of one. The index value N in this exemplary embodiment refers to a particular video data stream generated by one of the imaging devices 108a, 108b, 108c, 108d. Accordingly, N=1 could refer to a video data stream generated by imaging device 108a, N=2 could refer to a video data stream generated by imaging device 108b, and so on. At step 706, the processor 416 will access image data from a video data stream N. For example, if N=1, the processor 416 will access video buffer memory 414 to obtain image data generated by imaging device 108a. The process continues to step 708 in which the processor 416 analyzes the image data using a facial recognition algorithm (e.g. a facial recognition module included with face recognition module 422). As a result of such analysis, the processor will determine at step 710 whether a facial image is present in an image represented by the image data. As used herein, the term "facial image" refers to an image which includes a face of person. Notably, this step will not necessarily involve identification of a particular person, but can be instead a determination of whether a human face is present in the image.

If no facial image is determined to be present in step 710 (710: No), then the process continues directly on to step 716. However, if a facial image is found within the captured image (710: Yes), the processor can store a facial image data file 802a. The facial image data file 802a can include data sufficient to allow an EAS server 502 to perform an identification of a person based on the facial image. In some embodiments, such data can comprise an original or compressed version of the actual image in a suitable image file format. A single image is generally comprised of a greatly reduced amount of data as compared to continuously streaming video. Accordingly, in some scenarios disclosed herein the extraction of a facial image from the video data stream at the EAS detection system 100 can greatly reduce the amount of data that must be communicated to the EAS server 502. Consequently, an amount of communication bandwidth needed for implementing the facial identification feature herein will be greatly reduced as compared to a system in which streaming video is communicated from the EAS pedestal to a central server 502.

In order to achieve a further reduction in required communication bandwidth, the data communicated to the EAS server 502 can be comprised of selected values which define certain biometric facial features. Such data can be extracted by the processor 416 based on the image data which has been captured. An advantage of extracting such facial feature information at processor 416 is that it can potentially further reduce the amount of data which must be communicated to the EAS server 502 as compared to communicating a compressed image file. The facial image data file 802a can also include a time stamp indicating when the image data was obtained, and information specifying which imaging device was the source of the image data.

The method continues on to step 714 where a determination is made as to whether image data from all M video data streams has been analyzed. For example, in the embodiment shown in FIG. 3, the value of M would be 4, corresponding to the four imaging devices 108a, 108b, 108c, 108d. If image data from all of the video data streams has not been analyzed (714: No) then the value of N is incremented in step 716 and the process returns to 706. Steps 706-716 are repeated until image data from all N video streams has been analyzed. During this process, additional facial image data files (e.g. facial image data files 802b, 802c) can be stored in memory if facial images are recognized by the processor 416.

Figure 8:
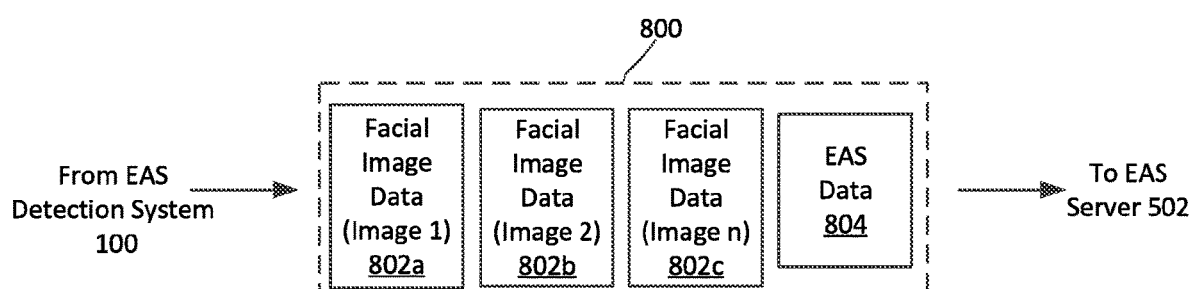
FIG. 8 is a diagram that is useful for understanding a data package that is communicated from an EAS detection system to an EAS server.

Once all of the video streams have been analyzed, (714: Yes) the processor 416 will generate in step 718 a data package for the EAS server. The data package will have a predetermined format. An exemplary data package 800 is shown in FIG. 8 and includes at least a facial image data file 802a and EAS data 804. The data package can also include additional facial image data files (e.g. 802b, 802c). If the facial image data file is to include facial feature information which has been extracted from the image, such information can optionally be combined in a single facial image data set, in which mean or average values representing facial feature information is included. Such values can be obtained by processor 416 by processing feature information extracted from two or more images obtained by the same or different imaging device 108a-108d. The processed information can then be included in the data package 800 as a single facial image data file.

The EAS data 804 can specify information useful for processing and classifying the image data. For example, the EAS data 804 can specify a particular EAS detection system $100_1$-$100_n$ from which the EAS data package 800 originated, the particular imaging device 108a-108b from which the image was obtained, whether or not an active tag has been determined to be present within an EAS detection zone during a time period concurrent with the capture of the facial image data, the time and date when such active tag has been identified. Notably, a facial image captured during a time period concurrent with detection of an EAS tag in a detection zone will be linked or bound to the EAS tag detection event. The actual length of the time period can be chosen to ensure that the captured facial image correctly corresponds to the person who is responsible for triggering the tag detection event. Increasing the time period allows a greater number of facial images to be generated, with some presumably more suitable for facial recognition than others. But the time period must not be too long or it will potentially capture facial images of persons not responsible for triggering the EAS event. A time period of one to two seconds will generally be adequate, but the present solution is not limited in this regard.

Those skilled in the art will appreciate that in certain types of EAS systems a tag which is detected in an EAS detection zone can be associated with a particular item of merchandise, or a particular class of merchandise. When such a tag is detected in the detection zone, it will identify the unauthorized item which is present in the detection zone. In such a scenario, the information concerning the merchandise item or class of item can be communicated to the EAS terminal as part of the EAS data 804. Once the data package has been assembled in step 718 as described herein, the data package 800 is communicated in step 720 to the EAS server 502. The communication of the data package can be accomplished using a suitable communication link (e.g. communication link $504_1$-$504_n$).

In step 722 a determination is made as to whether the process 700 should be terminated. If so (722: Yes), then the process terminates in step 724. Otherwise, the process returns to step 704 and the process continues with further EAS monitoring and video image processing as previously described.

Figure 9:
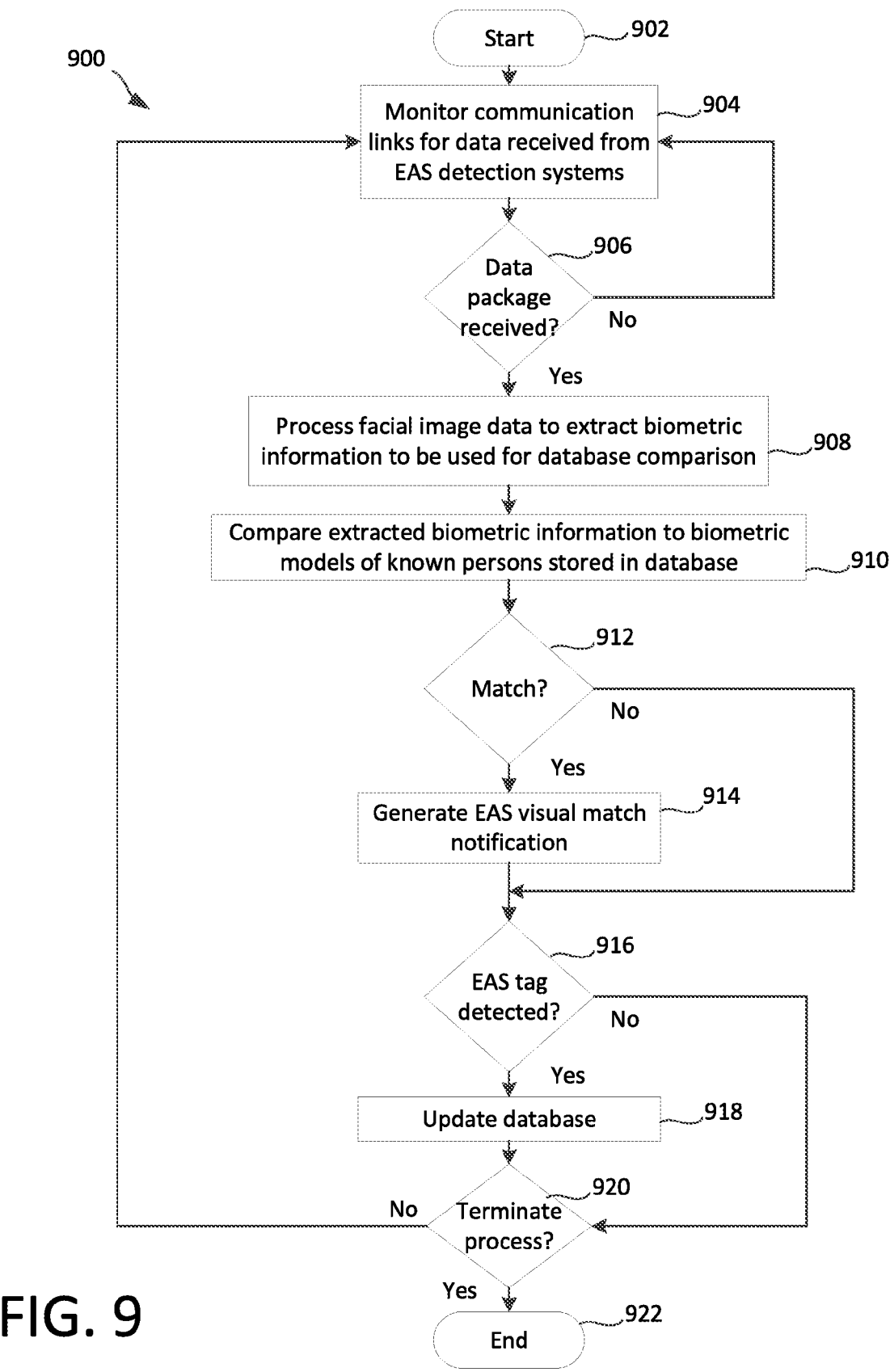
FIG. 9 is a flowchart that is useful for understanding alternative scenarios in which the present solution is employed.

There is shown in FIG. 9 an exemplary process 900 which is useful for understanding the facial identification processing performed at EAS server 502, and the manner in which the facial image database 506 is populated. The process begins in step 902 and continues with step 904 where the EAS server 502 monitors data inputs received from EAS detection systems $100_1$-$100_n$ by way of communication links $504_1$-$504_n$. At step 906 a determination is made as to whether a data package 800 has been received from one of the EAS detection systems. If so (906: Yes), then the process continues on to step 908 at which point facial image data (e.g. facial image data 802a, 802b, 802c) is processed to extract biometric facial information. The biometric information which is extracted in step 908 is selected so that it is suitable for comparison to biometric models of known individuals as stored in database 506. Any suitable biometric extraction method can be used for this purpose. Subsequently, in step 910 the extracted biometric data from a data package 900 is compared in step 910 to biometric models stored in database 506.

In step 912 a determination is made as to whether the biometric information extracted in step 908 can be matched to a biometric model of a known individual stored in database 506. A determination that a match has occurs will be based on this comparison step in accordance with a particular facial identification algorithm used by the EAS server. One skilled in the art will appreciate that numerous facial identification methods are possible for purposes of matching biometric information extracted from an image to biometric models stored in a database. Any suitable matching process can be used in step 912 without limitation, provided that it is capable of identifying a biometric model of a particular person based on the available image data contained in facial image data (e.g., facial image data 802a, 802b, 802c).

It should be appreciated that the facial identification processing performed at the EAS server 502 in step 912 can be different as compared to facial recognition processing performed at the system controller 110 at step 710. The facial recognition processing performed at step 710 by the system controller 110 can in some scenarios generally involves a determination that a human face is present within an image, but does not necessarily involve any attempt to match that particular face to a particular person (e.g. by comparison to biometric information associated with the face of a particular person as stored in a database 506). In contrast, the facial identification processing performed in step 912 at the EAS server 502 can involve processing which is intended to identify a particular person. This identification processing is based on a comparison of biometric data extracted from the facial image captured in real time at the pedestal to biometric models which are stored in a database (e.g. database 506). When there is a sufficient match between biometric data extracted from the facial image and the biometric models stored in the database, a match can be declared. Still, it should be appreciated that identification of a particular person as described herein does not necessarily involve determining personal information such as their name, but is instead a process of associating a captured facial image for that person to a biometric model for that person which was previously stored in the database. Accordingly, a person can be "identified" as a known person even without knowledge of their name, or other non-biometric identifying information. Further, it should be understood that the foregoing represents one possible system architecture where facial match processing for identification is performed at a central server. Other system architectures are also contemplated in which biometric comparisons to a database can occur at the EAS pedestal If a match is found (912: Yes), then the process continues on to step 914 where an EAS visual match notification is generated. The notification can include any type of audible or visual alert suitable to inform employees of the secured facility that a person has been identified who is known to have previously triggered one or more EAS alarms.

The notification described herein is advantageously a predictive notification of potential theft insofar as it predicts that a person is likely to commit an act of theft. A predictive notification could be simple alerting function (e.g. a silent alarm, audible alarm or visual alarm). As explained below in further detail, the notification can include certain information which is useful to allow a store associate to identify the person. For example, this information can include a captured image of the person for whom a facial match has been determined. The image data can include a current image capture and/or an image capture from a previous time when the image of the individual was captured. In some scenarios, the alert information can be communicated by an EAS server to a mobile device (e.g., a smartphone) carried by a store associate.

In some scenarios it can be advantageous for the predictive notification to also include at least some information which will indicate the level of theft risk associated with a person who has triggered the alarm. Such information can include the number of occasions that the person has triggered an EAS alarm in the past, or an EAS score which evaluates the risk of a particular person based on a variety of theft risk factors. The theft risk factors can be selected from the group consisting of a number of the EAS tag detection events, a number of store visits, and a value of merchandise indicated by the EAS tag detected.

Notably, the EAS data 804 can specify the source imaging device from which the facial image data is obtained. If this information is provided, the EAS server will use it to advantageously determine whether an identified person was detected entering or leaving the secured facility 500. For example, in the system shown in FIG. 3, it can be inferred by server 502 that facial images captured by imaging devices 108*c*, 108*d* corresponds to persons entering the secured facility, since the fields of view C and D for those imaging devices are directed toward the entry/exit 104. Conversely, the server 502 can infer that facial images captured by imaging devices 108*a*, 108*b* correspond to persons leaving the secured facility, since fields of view A and B for those imaging devices are directed toward the interior of the premises.

In some embodiments, the notification at 914 can be provided on a computer display unit 602 which is accessible to store employees. Accordingly, the notification can specify whether the identified person is entering or leaving the premises. This information can then be displayed on the computer display unit (e.g. computer display unit 602). The notification can also include a digital data file including the facial image of the person who has been identified. The facial image can optionally be displayed on the computer display unit so that store employees (or security personnel) will be able to recognize the person of interest who has been identified. Of course, the foregoing information can also be communicated to a mobile unit (e.g. a smartphone) carried by a store associate.

The database 506 can advantageously contain information beyond that which is needed for simply identifying a particular person based on a facial identification match. For example, the database can include detailed information which specifies the number of occasions that a particular person corresponding to a stored biometric model has triggered EAS alarms and the previous dates when such EAS alarms were triggered. In such a scenario, this information can be communicated to employees as part of the notification communicated in step 914. Subsequently, such information can be communicated to store employees by means of a visual interface, such as display unit 602.

According to another aspect of the present solution, the database 506 can include information concerning the previous items or class of items that was detected in a detection zone 304 when the identified person previously triggered an EAS alarm. For example, in an EAS detection system using RFID tags, the tag which is detected in an EAS detection zone 304 can specify the product or class of product to which the tag is attached. In such a scenario, this information can be communicated to the EAS server 502 as part of EAS data 804. The information can then be stored in the database 506 in association with a biometric model corresponding to the face of a particular person who triggered the EAS alarm.

Subsequently, the information concerning the types of merchandise previously detected in the EAS detection zone can be specified in the notification generated at step 914. This information can then be displayed on a visual interface, such as display unit 602. Information concerning specific products or types of merchandise previously detected can be useful for predicting future illicit behavior of the identified person. For example, if the database information indicates that the individual has previously triggered EAS alarms on five separate occasions, and on each such occasion the EAS tag corresponded to a certain type of item (e.g., jewelry), then the store employees could focus their attention on the store displays (e.g. a jewelry counter) associated with that particular item. The obvious presence and attention of the store employees at such locations will inhibit theft of the particular items known to be of interest to a particular person.

The processing performed at the EAS server continues at step 916 by determining whether the EAS data 804 indicates that an EAS tag has been detected. If so, then the database 506 is updated with new information. If a biometric model for a particular person already exists in the database (912: Yes) then the update to the database at 918 can involve modifying the information associated with that record. For example, the information can be modified or updated in step 918 to record a date and time when an EAS tag was detected in an EAS detection zone 304 in association with that person. If the EAS tag can be used to identify a particular item or class of item to which the tag is attached, then the updating step 918 can further involve storing data concerning the item or class of item that was detected in the EAS detection zone. The updating step can also involve storing updated image data associated with the person, or using the newly captured facial image data to improve the quality of an existing biometric model for that person's face.

If there is no match for a particular person's face within the database 506 (912: No), then in step 918 the updating step will involve creating a new database record. The new database record will include the biometric facial model or data for the particular face which has been captured in association with an EAS tag detection. A biometric facial model is associated with an EAS tag detection when a corresponding facial image was captured during a time period associated with a detected presence of the EAS tag in the detection zone. The new database record can also include the date/time of the EAS tag detection, and the merchandise item or class of item associated with a particular EAS tag detected in the EAS detection zone 304. After the database has been updated in step 918, the process continues on to step 920 where a determination is made as to whether the process is to be terminated. If so, the process terminates at 922; otherwise, the process returns to 904 where the process continues.

In an alternative scenario, the database updating in step 918 is not conditioned on a positive occurrence of an EAS tag detection in step 916. Accordingly, an existing database record can be updated regardless of whether an EAS tag has been detected. A database record for a person who has triggered an EAS alarm at least once will then be updated each time that person is identified as entering the premises of a secured facility. On some visits to the secured facility, the person may not trigger the EAS alarm and this information can be recorded in association with the facial biometric data record for such person. Likewise, when the person triggers an EAS alarm, that information can also be updated within the database 506. Over time, a pattern will emerge which will indicate the relative frequency with which the particular person triggers the EAS theft alarm. This pattern can be characterized by an EAS theft risk score or average. The score can specify the theft risk posed by the particular person based on their past behavior.

For example a person who triggers an EAS alarm on 49 out of 50 visits to one or more secured facilities will have a very high score (e.g. 98%) indicating that the person is highly likely to engage in theft on any particular visit to the secure facility. Such a person is a high risk person and may justify an immediate request for the presence of security personnel. A score of 50% would be assigned to a person who triggers an EAS alarm roughly half of the time when they visit a secured facility, and may require careful watching. Conversely, a very low score (e.g. 5%) may indicate that the person on average triggers EAS alarms only rarely. Such a score may indicate that the person is not likely to engage in merchandise theft and does not require presence of security personnel.

The scoring process can also be used to remove records from the database as needed. For example, the presence of the particular person within the database may have been caused by electrical noise, or a clerk's failure to remove an EAS tag. Over time, persons with very low EAS scores can be removed from the database. EAS scores can be determined using any suitable algorithm to account for the frequency of their store visits and other behavior. For example, a person who visits a store once and triggers an EAS alarm once would have a 100% EAS alarm trigger average but may not present a particularly high theft risk. Accordingly, the EAS score as described herein can be adjusted to account for this. According to another aspect, the EAS theft risk score can be adjusted in accordance with the value of the merchandise associated with previous EAS tag detections. If on previous occasions, the EAS tag detected in a detection zone in association with a particular person was attached to a high value item, then that person's EAS score could be increased as appropriate.

From the foregoing it will be appreciated that the database 506 is updated in step 918 using information collected by an EAS detection system 100. This updated information can be shared with other EAS servers 502 using any suitable method. For example, an EAS server 502 can periodically communicate updated information in its database 506 to a remotely located central server (not shown) which maintains a master database containing biometric facial data for persons who have triggered EAS alarms. Any suitable data communication method can be used for this purpose. Once the updated information has been received, the central server can then use the information to update EAS servers 502 for other secured facilities 500. Specifically, the updated information concerning biometric models, EAS tag detection dates/times, merchandise classification, etc. can be shared by the central server with a plurality of other EAS servers. For example, the updated data can be provided to all secured facilities 500 of a particular retail store chain, a plurality of secured facilities 500 within a particular shopping center, or a plurality of secured facilities 500 within a particular geographic area. Any suitable method can be used for performing data synchronization among the a plurality of databases 506 maintained by a plurality of EAS servers 502.

Facial identification processing is known in the art and therefore will not be described here in detail. However, those skilled in the art will appreciate that facial identification processing will involve processing performed by the EAS server 502 (or in some scenarios at an EAS pedestal) to identify a particular person corresponding to the one or more facial image data files (e.g. facial image data files 802*a*, 802*b*, 802*c*). Any suitable facial identification process can be used for this purpose. For example, in a scenario, the EAS server will compare facial feature information (based on the facial image data files) to facial feature information stored in a database and corresponding to certain known persons. In effect, the EAS server will perform an analysis of data representative of the facial image to determine if it comprises a biometric match relative to at least one biometric model of a facial image stored in a database. As a result of such processing, the EAS server will either identify a person or determine that the information contained in the facial image data file does not comprise a match to facial image data for any known person stored in its database. Those skilled in the art will appreciate that a biometric match as referenced herein need not be an actual exact match of biometric data stored in a database relative to biometric data extracted from a facial image. Instead, a biometric match can declared where the captured facial image satisfies a predetermined measure of similarity of facial features relative to a biometric model for a particular person. This sufficient level of similarity can be deemed to be a "match" for purposes of the present solution even though an exact match may not exist. This arrangement facilitates facial identification in scenarios where he biometric models stored in the database and/or the facial images collected do not perfectly represent a face of a particular person.

Those skilled in the art will appreciate that accuracy of facial recognition systems is enhanced by obtaining good quality images that fully and accurately facilitate extraction of feature information. Still, it is desirable for a facial recognition system to remain unobtrusive. These competing requirements can create challenges with regard to camera placement. The problem is complicated by the need in many instances to have facial image data from two or more camera angles with respect to a target individual. This problem is solved in the present solution by placing imaging devices directly on the EAS pedestals. This placement positions the cameras at the optimum height for facial recognition software (approximately 60 inches) and directly in the path of pedestrian ingress and egress. In some scenarios, two or more such cameras can be positioned at two or more different heights to capture facial images of persons of different stature. The cameras and faces of target persons (typically pedestrians) are in a substantially parallel orientation to each other. This provides a more frontal view of the target individual's faces that is more suitable for facial identification as compared to the oblique camera angles which are prevalent when cameras are mounted at other locations. Imaging devices 108*a*-108*h* can be arranged to capture images of a person's face from a selection of viewing directions that are deemed optimal for facial image recognition and identification.

A significant advantage of the system and methods described herein concerns the reduction in bandwidth required for facilitating enhanced EAS operations. Facial recognition processing is performed using the control system 110 located at the EAS pedestal. Conversely, facial identification processing is performed for one or more EAS detection systems 100 at a remotely located EAS server. This approach reduces the need for expensive and substantial processing resources at the EAS pedestal 100, while also minimizing system bandwidth requirements. Bandwidth requirements are reduced by eliminating the need for streaming video from numerous EAS pedestal locations to the central EAS server 502. The foregoing features facilitate integration of a facial identification feature into an EAS pedestal system with minimal additional expense.

Those skilled in the art will appreciate that the system controller architecture illustrated in FIG. 4 and the EAS server architecture in FIG. 6 each represent one possible example of a system architecture that can be used with the present solution. However, the present solution is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further reductions in communication bandwidth requirements can be effected by shifting additional processing responsibilities from the EAS server 502 to the EAS detection system 100. For example, in some scenarios, facial identification processing as described herein can be performed at system controller 110. In such embodiments, the database 506 is provided at the EAS server and can be accessed by system controller 110. In some embodiments, the database 506 can also be provided within memory 418. If facial identification processing is performed at system controller, then the face recognition module 422 can include software algorithms which facilitate facial identification processing. In such an embodiment, the EAS visual match notification 914 would be generated by the processor 416 at system 110. The EAS server can be omitted in such a scenario, or it can serve as a central communication hub for updating the facial identification data which is contained within the database 506. For example, updated facial identification data can be communicated from the EAS server 502 to each EAS detection system 100 using communication links $504_1$-$504_n$.

By utilizing the methods and systems disclosed herein, the face images (and/or facial image data) of suspected shop lifters which correlate with the time instances of EAS pedestal alarms will be tagged and enrolled anonymously in a database. But it is to be expected that there will be situations where there are multiple persons proximal to the EAS pedestal (at around the same distance from the camera) when the EAS pedestal alarm is triggered. In those instances, face images of all the persons captured in a field of view of a camera can be enrolled in the database after a deduplication step. During this process, it is likely that face images or facial data of genuine shoppers would be enrolled in the database along with similar information for shoplifters. According to one aspect, a system as disclosed herein can perform operations to minimize the extent to which genuine shoppers are enrolled or retained in a shoplifter facial image database.

In other words, the system can learn to discriminate between the repeat offenders who may set off EAS alarms on one or more occasions, as compared to the genuine shoppers. The system can then selectively delete or remove from the database the face images of the genuine shoppers who are not involved in shoplifting activities.

In some scenarios, when facial images of a plurality of persons are captured at the time when the EAS alarm has been triggered, the system can determine whether there is a face present in a captured image which corresponds to a known shoplifter who is already in the database. In such scenarios, it can be advantageous to exclude from enrollment in the database any other persons whose faces are concurrently captured in the same image.

Further, in other scenarios, depth or distance sensors can be used to discriminate between genuine shoppers and shoplifters. Rule-based algorithms can be applied in such scenarios to facilitate such discrimination. Consequently, certain faces/facial data can be excluded from enrollment in the database when those faces do not satisfy certain rules with respect to distance from the sensor at the time the EAS alarm was triggered.

Any suitable set of rules can be applied for this purpose. The rules can involve certain assumptions regarding which person among a group of persons captured in an image is most likely to have set off the EAS alarm. For example, in some scenarios, the closest person to the EAS pedestals can be determined based on the information from one or more depth or distance sensors. Such sensors can include ultrasonic sensors, stereoscopic sensor, or any other suitable sensor technology which is capable of determining a distance from the sensor to one or more persons in a captured image. The person closest to the EAS pedestal (or to the sensor) IN such scenarios can be assumed to be the most likely person to have set off the alarm. Accordingly, facial images/data for persons other than the closest can be systematically excluded from the enrollment process.

Figure 10:
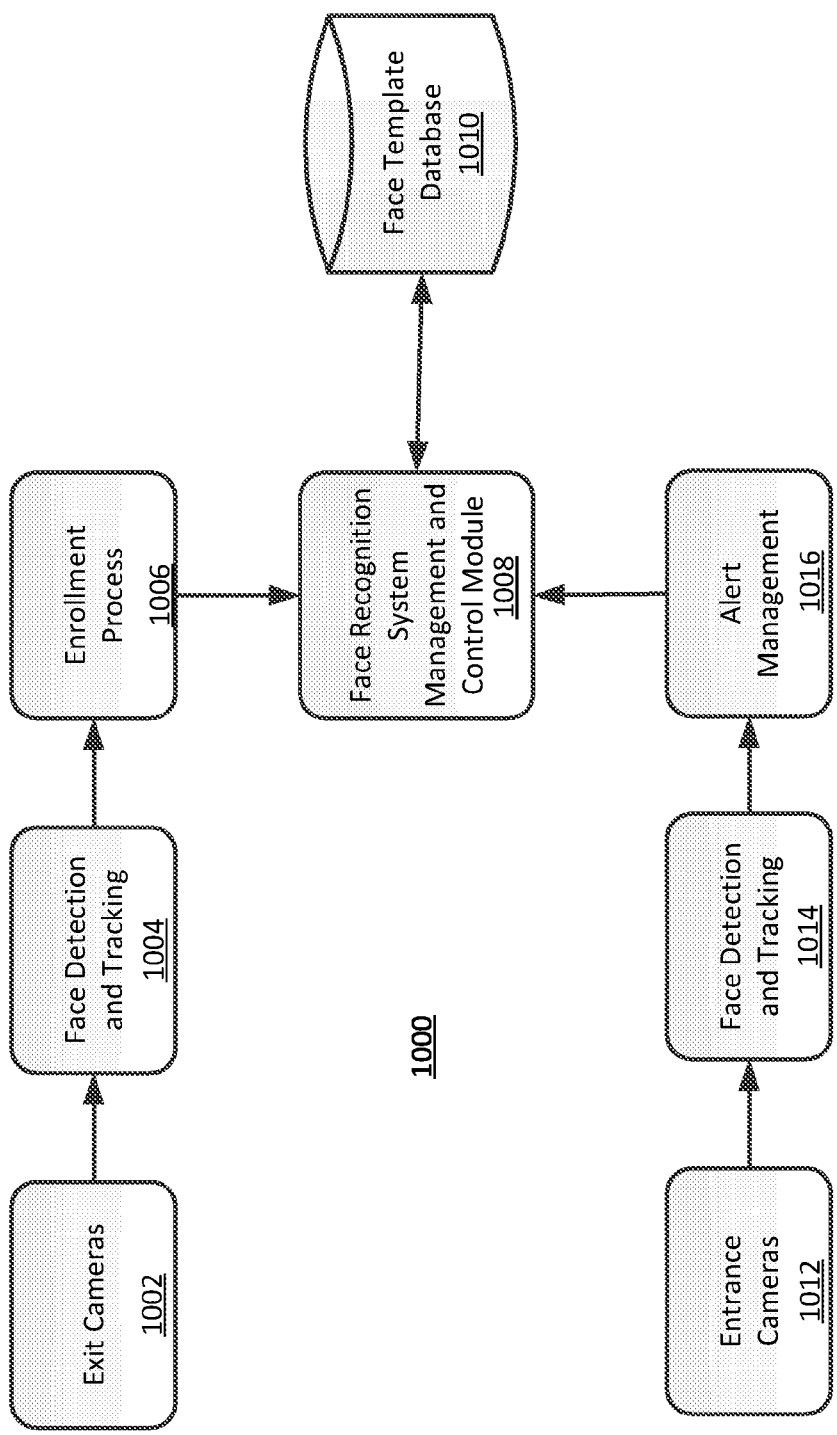
FIG. 10 is an architectural block diagram that is useful for understanding the operation of a face recognition system disclosed herein.

Referring now to FIG. 10, it will be understood that a face recognition system 1000 can comprise one or more Face Recognition Camera(s) (FRCs) 1002, 1012 and a Face Template Database (FTD) 1010. The FRC(s) can include cameras designed to capture persons exiting a facility (exit cameras) and persons entering a facility (entrance cameras). The term FRC is sometimes used in this disclosure to define video camera(s) (e.g., cameras 108a-108h), which are mounted in such a way that human face(s) of shoppers present in a retail environment are clearly visible to the camera as such persons are entering or leaving a retail facility. Such FRC(s) can facilitate face recognition using identifying face templates present in the FTD. In some scenarios disclosed herein, the one or more FRC(s) are advantageously selected so that they are configured for continuous video streaming with high shutter speed. According to one aspect, the FRC may have integrated face detection and face tracking processing facilities 1004, 1014 running in the edge device. Otherwise any local or cloud server may run the face detection and face recognition processes using the video stream captured by the FRC.

An FRC as disclosed herein can use human detection capability to trigger or run the face detection and face recognition processes. Otherwise the face detection and face recognition processes may run continuously to avoid any oversight.

The FRC should be configured to facilitate tracking of a human being who is present in the field of view of the FRC. The tracking algorithm may be configured to facilitate either human tracking or human face tracking. Such tacking capability can be configured to isolate each individual human being or human face from others. Such a capability can be particularly advantageous in scenarios where a plurality of people appear in field of view of a particular FRC. Tracking as described herein is advantageous as it can facilitate generating precise face image in a video buffer(s) for each person in a camera field of view. The FRCs may be installed at the entry and exit doors, POS terminals or self-checkout terminals, store aisles, parking lots, and so on.

The Face Template Database (FTD) 1010 is created with the face image(s) or facial image data models captured by an FRC (e.g., an exit FRC). The FTD will contain facial images and/or facial image data models of persons who have been identified as potential repeat shoplifting offender(s). A face enrollment process (which is described below in further detail) will create the face template(s) corresponding to potential repeat shoplifting offender(s), who pass by the EAS pedestal with unpaid merchandise and hence trigger an EAS pedestal alarm. The name of the face templates can be chosen to facilitate anonymity of a person, while still providing some meaningful information useful for the system operation as described herein. For example, the template name may be some combination of enrollment time, retail store name, and some other useful information, and so on. The face template can comprise facial images, facial image data models and other information associated with the anonymously identified individual.

The system includes an enrollment module 1006. There can be several processes involved in enrolling the repeat offender (s). These processes can include steps which are intended to exclude genuine customers from being enrolled. These processes can also include steps which are useful for eliminating genuine customers from an FTD after they have already been enrolled. The system can further include an alert management module 1016. Access to the FTD 1010 is controlled by a face recognition system management and control module 1008.

Figure 11:
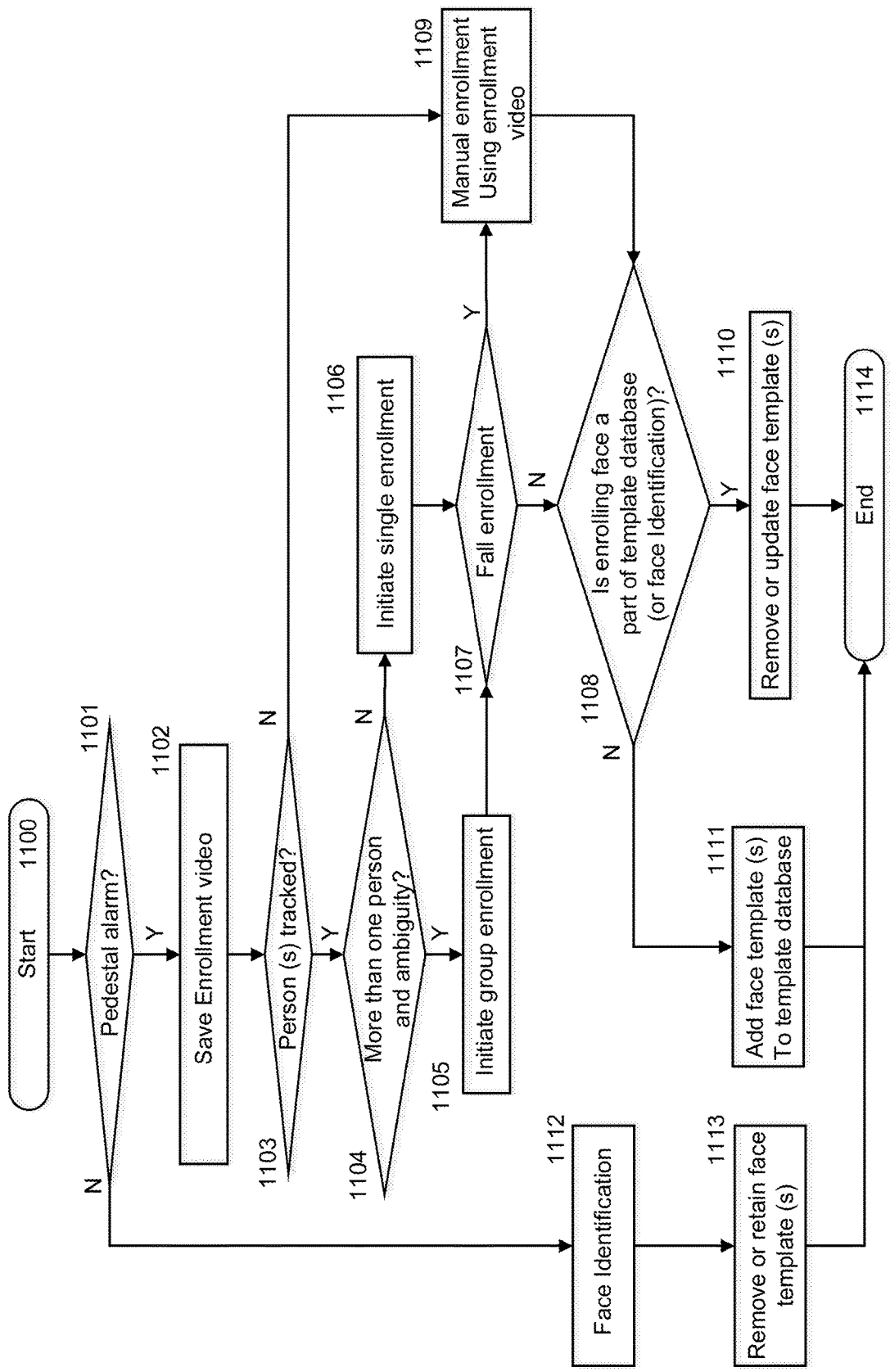
FIG. 11 is a flow chart which is useful for understanding a process for enrollment of one or more persons in a database of a face recognition system used for theft detection.

The enrollment process is described below in greater detail with reference to FIG. 11. The process can begin in 1100 and continues to 1101 where a determination is made as to whether an EAS alarm condition exists. If there is an alarm (1101: Yes) in the EAS pedestal, an "enrollment video clip" is saved 1102. The enrollment video clip is created using the buffered video frames during a time associated with the EAS alarm. The amount of buffered frames may vary based on any user settings (usually 5 to 10 seconds worth of video frames or any other number of seconds). This enrollment video may be useful for visual inspection of the EAS alarm event for manually managing (adding, modifying and deleting) the anonymous FTB.

In one scenario it may so happen that the exit FRC may not be able to track any person in front of it (1103: No) at the time of pedestal alarm. In that scenario a process may send the enrollment video for manual inspection and manual enrollment (1109).

In another scenario it may so happen that the exit FRC may be able to track one single person in front of it (1104: N). In that scenario a process may initiate single enrollment in step 1106 at the time of pedestal alarm. The face image(s) of the tracked person may be enrolled in this process and the face template will be saved into the anonymous FTD. This enrollment of the face image (s) of a single person may be termed as the single enrollment.

In another scenario it may so happen that the exit FRC may be able to track more than one single person in front of it (1104: Yes)) at the time of pedestal alarm. In that scenario there may be ambiguity to judge the exact potential repeat offender due to whom the EAS pedestal alarm occurred. The term "group enrollment" is used in such ambiguous scenario (s). The enrollment process may initiate enrolling face images of all the people in front of the exit face recognition camera thereby creating unique face templates in FTB (step 1105). The group enrollment may consists of potential repeat offender as well as genuine customer (s). In the group enrollment scenario some indicative phrase may be associated into the unique template names so that that the templates of the same group can be identified easily.

In another scenario, there may be certain techniques to overcome the ambiguity even if the exit FRC may be able to track more than one single person in front of it (1104: No) at the time of pedestal alarm. These techniques may be used to minimize the group enrollment so that genuine customer (s) are not enrolled along with the repeat offender (s). In that scenario a process may initiate single enrollment (1106). Following are some of the techniques may be used to overcome ambiguity in deciding the person for whom the pedestal alarms.

One technique to overcome ambiguity may be analyzing the face sizes of different tracked face images in front of the exit face recognition camera. If face size of one person is distinctively large enough in comparison to the other face images, then the face enrollment process may consider enrolling the face image (s) buffer of—the person having largest sized face image at the time of alarm. The largest size face image (s) specifies that the person may be closest to the EAS pedestal as the exit face recognition camera is placed near to the EAS pedestal.

Another technique to overcome ambiguity may involving utilizing depth sensing capability to identify the person who is closest to the EAS pedestal. In such scenarios, the face enrollment process may consider enrolling the face image (s) of the person who is closest to the EAS pedestal as identified by the depth sensor.

In yet another technique to overcome ambiguity, there may be some FRC installed near to POS of retail store to enroll face images of customer (s) into a staging face template database. In that case the face enrollment process may consider enrolling the face image (s) of the person who was not enrolled (or could not be recognized against the POS face template database) in the face recognition camera (s) near the POS.

In another technique to overcome ambiguity, physical movement of RFID tagged merchandise on store shelfs may be detected by analyzing the RF phase information from RFID readers provisioned in store aisles. Alternatively the RFID tags might be integrated with accelerometers with a provision of providing the accelerometer output data as part of the RFID protocol parameters. SKU as well as item level identification of RFID tags may also be available from the RFID readers. Face images corresponding to the time instances of the RFID tag movement could be captured and stored into a staging database indexed with item level identification. During an EAS pedestal alarm event which includes information about the item level identification of the unpaid merchandise, if any of the face is identified with the face in the staging database with-in predefined time interval then such faces which are moved into the more persistent face data base. In case a group of faces are detected during the EAS alarm event the rest of the faces may be considered to be exempted from enrollment.

Additionally the face enrollment process may consider enrolling a group enrollment by assessing a different weightage (risk or threat score) to each person. Such weighting could be based on the information available or derived from using the above techniques described for minimizing ambiguity and hence group enrollment. For example, a face template name may associate fields like face size, distance of the person from pedestal (depth), whether enrolled at POS or not and face image association with the item level identification of unpaid merchandise etc.

Referring once again to FIG. 11, there may be instances where the enrollment process fails (1107: Yes) due to various reasons like "Eye (s) closed", "Too much profile view" and "High motion blur" in the face image (s). In that scenario a process may save the face image(s) in a failed enrollment database and send the enrollment video for manual inspection and manual enrollment in step 1109.

Moreover, it may be important in some scenarios to initiate enrollment process if multiple faces are in field of view of the exit facing camera and at least one face is recognized along with EAS alarm event (1108: No). In such a scenario, all the face images which are not already present in the FTD will be enrolled at step 1111. This is to ensure that the system will not miss out enrolling potential repeat offenders or first time offenders who were in a group along with an genuine customer who was recognized by the system.

The system can also include a de-enrollment process 1110 which is configured to delete genuine customer face information from database. Consider that the face image(s) of genuine customer(s) may be enrolled into the anonymous FTD due to various circumstances described above. For example, a genuine customer may be enrolled as a part of group enrollment or single enrollment under circumstances where the system has failed to identify the repeat offender. Some techniques may be used to eliminate the genuine customer's face templates from the anonymous face template database.

One such technique can involve a scenario in which a repeat offender is recognized and the face template of the repeat offender is associated with an earlier group enrollment. In such instances, the enrollment video clip for the specific group enrollment may be sent for manual intervention. Then the rest of the template(s) of the group enrollment may be eliminated from the anonymous FTD with the help of manual judgement verifying the enrollment video clip (step 1110).

In another scenario involving step 1110, a video clip namely "behavior video clip" may be saved at the all instances of face recognition by any of the FRC (POS, aisle, parking lot, entry, exit etc.) and indexed by the anonymous face id. Such behavior video clip (s) can be presented for automatic or manual analysis and may be the associated with appropriate behavior (adverse) scores. An EAS alarm event may trigger the presentation of all such behavior clips or threat scores for each anonymous face ID recognized in the field of view on a smartphone GUI to the loss prevention personnel. An automatic recommendation based on the threat scores aggregated from several video clips may also be presented on the GUI either to retain or delete the face record and appropriate action may be taken manually.

In one scenario there may not be any EAS pedestal alarm (1101: No), but there may be a face recognition (e.g. a face recognition occurring at 1112). It may so happen due to a fact that a genuine customer may have been earlier enrolled due to some ambiguity. In that scenario the enrollment video clip for the specific enrollment may be sent for manual intervention. Then in step 1113 the template (s) of the specific enrollment may be eliminated from the anonymous FTD with the help of manual judgement verifying the enrollment video clip. Apart from this the behavior video clip (s) along with the aggregated threat scores may also add value for manual judgement.

In another scenario, it may so happen that there may be more than one template created for one particular person. This may be due to the fact that the person may not be recognized by the face recognition system at the time of EAS pedestal alarm even though the face template exists for the person. One technique to combine the face template of the same person is with manual intervention of the store personnel, who receives an alert when the potential repeat offender enters or is present in the retail store. If the store personal is convinced by observing the matched face images of more than one templates are of the same person, the store personnel may place a request using some software tool to combine these templates into one in the anonymous face template database.

It may so happen that a potential repeat offender may not get recognized due to lower confidence score than threshold produced by the face recognition system. This is due to the fact that the person's appearance at a certain time may be different than the appearance when the template was originally created for the person. Moreover, the facial features may get changed due to age, illness, beard growth and so on. In such case a software tool can be used for manual inspection to increment or add the face image (s) of such cases to the person's face image template. Apart from the above enrollment process, face template (s) may be added manually using a face image database of repeat offender (s) to the anonymous face template database.

Various additional enhancements can be made to the basic system to render it more effective. For example, when a repeat offender (suspect) exits the store, a network of cameras can be used to track the suspect to the parking lot. The cameras can be used to acquire license plate data of the vehicle used by the suspect and this information can then be used to update the database. Subsequently an automatic license plate recognition system may be used to alert the store personnel when the suspect subsequently visits the store so that appropriate counter measures can be taken up.

By using one or more cameras mounted at point of sale (POS) terminals or at the self-check-out kiosks, additional capture of facial images is possible. The payment (transaction) details along with the face images may be stored in a staging database. When a payment fraud (check bounce, stolen credit card etc.) is reported then the corresponding face images would be moved into the FTD.

Another useful aspect of a system as disclosed herein is prediction of loss prevention events based on the machine learning models. The following set of features may be used to build the prediction model.

Repeat offender face identification
Store location
Time of the day, day of the week, month a repeat offender is detected
Time interval between two detections
Time spent by a repeat offender in store
Number of faces associated with the detection, face sizes
Graph of face recognized at various cameras (entrance, aisle, POS, exit) with weights as the time intervals
SKUs associated with detection. The EAS pedestals can also be provisioned with RFID readers and SKU information corresponding to EAS alarm can be a data feature
License plate numbers in parking lot at the time of detection
Detection at POS/Self Check out Kiosks (Yes/No)
Items (SKU or item level identification information) moved during the time interval (RFID optionally fitted tags with accelerometer provide this data). (The movement of the tags can be detected by using the tag related data such as RF phase output from RFID readers incorporated in store aisles. The SKU or item level information will also be available from the RFID readers)
Inventory loss (SKUs) reported during the period The above features can be provided to a machine learning system which can perform clustering, association or classification techniques. A set of rules can be learnt from the data analytics and deployed on the rule engines in Enrollment, De-enrollment and Alert management modules. An exemplary associative rule which could be learnt is how often repeat offenders are detected at POS or Self Check out kiosks during a store visit. Knowledge of association could be used to fine tune the enrollment or de-enrollment process of face images.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for predictive theft intervention at a secured facility, comprising:
   generating image data using at least one imaging device;
   processing the image data in a computer processing device to recognize a presence of a facial image comprising a face of a person within the image data;
   performing an analysis of data representative of the facial image to determine a biometric match relative to at least one of a plurality of biometric models of facial images stored in a database;
   generating at least one predictive notification of a future potential theft of merchandise from the secured facility responsive to a determination of the biometric match; and
   applying selective control of a content of the database through a rules-based enrollment process in which one or more facial images of different persons are concurrently captured in an image frame by an imaging device.

2. The method according to claim 1, wherein the rules based enrollment process involves automatically selecting at least one facial image for enrollment based on a measured distance from a predetermined alert detection location.

3. The method according to claim 1, wherein the rules-based enrollment process involves automatically selecting at least one facial image for enrollment based on a relative size of a facial image within a captured image frame as compared to other faces captured within the image frame.

4. The method according to claim 1, wherein the rules-based enrollment process involves automatically excluding at least one captured facial image for enrollment based on a determination that at least one captured facial image within an image frame is already present within the database.

5. The method according to claim 1, wherein the rules-based enrollment process involves a comparison of at least one facial image captured within an image frame at the a time of a theft detection alert, with at least one facial image captured at a point-of-sale.

6. The method according to claim 1, wherein the rules-based enrollment process involves a comparison of at least one facial image captured within an image frame at a time of a theft detection alert, with at least one facial image captured in response to detected physical motion of an electronic tag associated with an item of merchandise.

7. The method according to claim 6, wherein the rules-based enrollment process further comprises a comparison of a value associated with the electronic tag at the time of the detected physical motion and a value of an electronic tag which resulted in a theft alert trigger event.

8. The method according to claim 7, wherein the rules-based enrollment process further involves automatically deselecting for inclusion in the database at least one facial image based on a determination that the at least one deselected facial image was not captured as a result of physical motion of the electronic tag which caused the theft alert trigger event.

9. The method according to claim 1, further comprising applying a weighting value to at least one facial image stored in the database based on at least one characteristic selected from a group consisting of relative distance from a location where a theft alert triggering event was detected, a relative size of a first facial image as compared to at least a second facial image captured in the same image frame, and preexisting enrollment of the facial image in the database.

10. The method according to claim 1, further comprising concurrently enrolling a plurality of facial images in the database responsive to an occurrence of one or more facial images of different persons being concurrently captured by an imaging device for possible enrollment in the database responsive to a theft alert trigger event.

11. The method according to claim 10, further comprising selectively de-enrolling at least one facial image from the database in response to an occurrence of at least one subsequent event.

12. The method according to claim 11, wherein the event comprises a subsequent theft detection trigger event involving detection of a facial image associated with a second one of the one or more facial images of different persons which was concurrently captured in the image frame.

13. The method according to claim 1, further comprising determining personal identifying information about the person whose facial image was captured in an image frame by using at least a second imaging device.

14. The method according to claim 1, applying machine learning to information collected at a time of a theft alert trigger event to predict at least one loss-prevention event.

15. The method according to claim 14, wherein the information is selected from a group consisting of face identification, store location, time of day, week or month when a face identification occurs, a time interval between two detections of a theft event, a time spent by a person who's facial image is already present in the database, a license plate number in a parking lot at a time when a facial image was enrolled or a theft detection alert occurred, detection at a point of sale location, item level identification information at the time of theft detection.

16. A system for predictive theft intervention at a secured facility, comprising:
   at least one imaging device arranged to generate image data;
   at least one computer processing device configured to recognize a presence of a facial image comprising a face of a person within the image data,
   perform an analysis of data representative of the facial image to determine a biometric match relative to at least one of a plurality of biometric models of facial images stored in a database,
   generate at least one predictive notification of a future potential theft of merchandise from the secured facility responsive to a determination of the biometric match; and
   apply selective control of a content of the database through a rules-based enrollment process in which one or more facial images of different persons are concurrently captured in an image frame by an imaging device.

\* \* \* \* \*